US008054968B2

(12) United States Patent
Ma et al.

(10) Patent No.: US 8,054,968 B2
(45) Date of Patent: Nov. 8, 2011

(54) METHOD AND APPARATUS FOR PROVIDING PREPAID MUSIC CARD FOR DECIPHERING RECORDED BROADCAST AUDIO SIGNALS

(75) Inventors: Hien D. Ma, Delray Beach, FL (US); Argy Petros, Parkland, FL (US); Stelios Patsiokas, Coral Springs, FL (US); Paul D. Marko, Pembroke Pines, FL (US); Kenneth Lerner, Boca Raton, FL (US); Frank Falcone, Loxahatchee, FL (US)

(73) Assignee: Sirius XM Radio Inc., New York, NY (US)

( * ) Notice: Subject to any disclaimer, the term of this patent is extended or adjusted under 35 U.S.C. 154(b) by 1216 days.

(21) Appl. No.: 11/379,040

(22) Filed: Apr. 17, 2006

(65) Prior Publication Data

US 2007/0098159 A1 May 3, 2007

Related U.S. Application Data

(63) Continuation-in-part of application No. 09/388,926, filed on Sep. 2, 1999, now abandoned.

(51) Int. Cl.
| | |
|---|---|
| *H04K 1/06* | (2006.01) |
| *G06F 5/00* | (2006.01) |
| *G06F 17/30* | (2006.01) |
| *H04L 9/32* | (2006.01) |

(52) U.S. Cl. ............ 380/37; 710/52; 713/176; 726/30
(58) Field of Classification Search ............ 380/37; 713/176

See application file for complete search history.

(56) References Cited

U.S. PATENT DOCUMENTS

| | | | | |
|---|---|---|---|---|
| 5,757,909 | A | * | 5/1998 | Park ........................... 380/201 |
| 5,790,935 | A | * | 8/1998 | Payton ........................ 725/91 |
| 5,914,941 | A | * | 6/1999 | Janky ........................ 370/313 |
| 5,943,423 | A | * | 8/1999 | Muftic ........................ 705/67 |
| 6,101,051 | A | * | 8/2000 | Sugita et al. .................. 360/2 |

(Continued)

FOREIGN PATENT DOCUMENTS

JP 11102465 A * 4/1999

OTHER PUBLICATIONS

Tuttlebee, et al., Software radio-impacts and implications, Spread Spectrum Techniques and Applications, 1998. Proceedings., 1998 IEEE 5th International Symposium on, Publication Date: Sep. 2-4, 1998, vol. 2, On pp. 541-545 vol. 2.*

(Continued)

*Primary Examiner* — David Pearson
*Assistant Examiner* — Morshed Mehedi
(74) *Attorney, Agent, or Firm* — Roylance, Abrams, Berdo & Goodman, L.L.P

(57) ABSTRACT

An apparatus and method are provided for deciphering recorded digital audio signals and using a smart card to pay for deciphering. Encrypted digital audio signals are recorded onto a recording medium, such as a compact disc or the like. When the user desires to listen to the recording, the encrypted recording is inserted into a player/recorder and a prepaid smart card is inserted into a smart card reader connected to the player/recorder. The smart card reader deducts a predetermined value from the card before allowing the player/recorder to decipher the encrypted recording, and record the deciphered audio onto a recording medium for playback.

17 Claims, 4 Drawing Sheets

U.S. PATENT DOCUMENTS

| | | | |
|---|---|---|---|
| 6,223,210 B1 * | 4/2001 | Hickey | 709/203 |
| 6,272,535 B1 * | 8/2001 | Iwamura | 709/217 |
| 6,363,440 B1 * | 3/2002 | Stepp et al. | 710/52 |
| 6,408,332 B1 * | 6/2002 | Matsumoto et al. | 709/219 |
| 6,775,654 B1 * | 8/2004 | Yokoyama et al. | 704/500 |
| 7,055,166 B1 * | 5/2006 | Logan et al. | 725/32 |
| 7,313,810 B1 * | 12/2007 | Bell et al. | 725/116 |
| 2004/0266336 A1 * | 12/2004 | Patsiokas et al. | 455/3.04 |

OTHER PUBLICATIONS

Michel, D., DAB development in France: a progress report on technical and services aspects, Proceedings of the 1997 International Broadcasting Convention, IEE Conference Publication ( IEE Conf Publ ) 1997 -/447 (400-404).*

* cited by examiner

METHOD AND APPARATUS FOR PROVIDING PREPAID MUSIC CARD FOR DECIPHERING RECORDED BROADCAST AUDIO SIGNALS

CROSS-REFERENCE TO RELATED APPLICATIONS

This application is a continuation-in-part of U.S. patent application Ser. No. 09/388,926, filed Sep. 2, 1999 now abandoned, the entire contents of which are expressly incorporated herein by reference. Related subject matter is disclosed and claimed in U.S. patent application Ser. No. 10/831,343, filed Apr. 26, 2004; U.S. patent application Ser. No. 09/263,207, filed on Mar. 5, 1999 (now U.S. Pat. No. 6,493,546); and in U.S. patent application Ser. No. 09/310,352, filed on May 12, 1999 (now U.S. Pat. No. 6,272,328); the entire contents of said applications being expressly incorporated herein by reference.

FIELD OF THE INVENTION

The invention relates to a method and apparatus for deciphering recorded digital audio broadcast signals. More specifically, the invention relates to a prepaid smart card for insertion into a playing and recording device for deciphering recorded encrypted audio signals which a user desires to hear, deducting monetary credits from the prepaid smart card, deciphering the encrypted digital audio signal and recording the deciphered digital audio signal.

BACKGROUND OF THE INVENTION

Scrambling and encryption of broadcast signals to prevent unauthorized listening or viewing of audio and video programs is a well known technique in the art of pay-per-view services. In the case of cable or satellite television transmissions, a set-top box is programmed by the broadcasting service to descramble or decipher channels which are subscribed to, and paid for, by a user. When a user desires to access a pay-per-view service, such as a pay-per-view movie, one method requires the user to call up the service provider to order the movie. The user receives an authorization code to enter manually into the set-top box. If the user waits until the start of the movie before calling for an authorization code, the user will miss the beginning of the movie.

Smart cards, also known as prepaid transaction cards, have been used in various business sectors to prepay for services, such as long distance telephone service, photocopy machines, and train transportation. A card equipped with a magnetic or electronic recording medium, such a magnetic strip or a memory chip, is sold to a user. Monetary value is encoded on the cards' recording medium, the amount of which is determined by the user within limits set by the service provider. For example, when a smart card is used for daily commuting on a local rail system, the maximum monetary value which can be placed on the card may be limited by the amount of currency that will be accepted by the card vending machine. The amount that a smart card can have at any one time may also be limited for security reasons, since the card is not limited to use by any one person and is simply a means to convert legal tender to a more convenient electronic form.

Electronic transfer of digital information to a user is described in U.S. Pat. No. 5,845,262. A user selects information to be retrieved, and inserts a prepaid card into an information vending machine. The vending machine deducts an amount needed to pay for the selected information, and records the purchased information onto a recording medium, which can be the smart card, an IC card, a floppy disk, and the like. The information is transferred to the user in a readily readable format.

Dissemination and sale of a digital product using personal computers is described in U.S. Pat. No. 5,898,777. An encrypted digital product, such as software, is downloaded to a user computer. A purchaser triggers a purchase, using unencrypted purchasing software provided with the encrypted product, between the personal computer and a bank network. The merchant receives credit for the purchase from the banking network, and the encrypted product is deciphered by the purchasing program. In this manner the merchant does not have to deal with giving the user cumbersome decipher keys to enter manually.

SUMMARY OF THE INVENTION

In accordance with the present invention, an apparatus is provided for the deduction of monetary credits from a smart card and the deciphering of an encrypted digital audio recording.

In accordance with another aspect of the present invention, a method is provided whereby a user can record an encrypted digital audio broadcast onto a recording medium, then insert a smart cart having monetary value encoded thereon into a player, in order to begin the deciphering process. The player deducts the appropriate number of credits or monetary amount from the smart card, and proceeds to decipher the encrypted recording. As the recording is deciphered, the player records the deciphered digital audio onto a second recording medium.

In another aspect of the invention, the first and second readable/writeable medium are the same. In this manner, following the deduction of the appropriate number of credits or monetary amount from the smart card, a portion of the encrypted recording is deciphered and stored in a buffer. The deciphering process is interrupted while the deciphered portion in the buffer is transferred and recorded onto the recording medium.

In another aspect of the invention, the key to decipher the recording is contained in memory in the player. The key can only be activated when the appropriate number of credits or monetary amount from the smart card has been deducted.

In another aspect of the invention, the smart card can be purchased from a vendor or vending machine, and the monetary value of the smart cart can be adjusted up or down for the user by the vendor or vending machine. An automatic teller machine can be used as a vending machine where a user can add monetary value to the smart card.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF EXEMPLARY EMBODIMENTS

Figure 1:
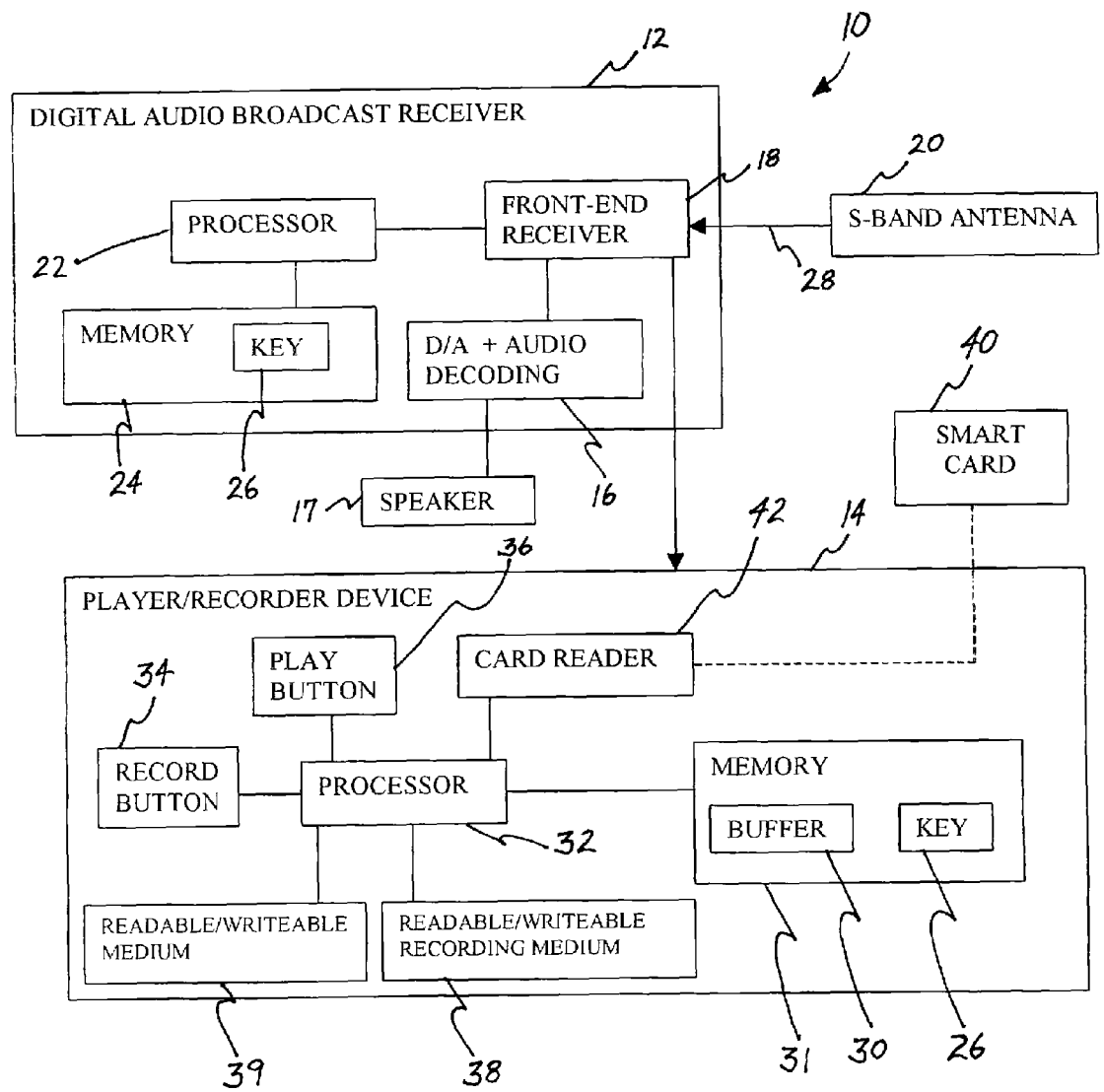
FIG. 1 is a block diagram of a digital audio broadcast receiver connected to a player/recorder equipped with a smart card reader in accordance with an embodiment of the present invention.

FIG. 1 depicts a combined receiver, recorder and player system 10 constructed in accordance with the present invention. The system 10 comprises a receiver 12 and a player/recorder 14.

The receiver 12 is preferably an S-band receiver which receives satellite digital audio radio service (SDARS) broadcast signals from a satellite via an antenna 20. The receiver 12 can also receive S-band signals from a terrestrial source when the satellite signals are not available. The receiver unit 12 comprises a radio frequency (RF) front-end receiver 18 for receiving, and demodulating the signals received via an S-band antenna 20 for output via the A/D and audio decoder system 16. It will be understood that the output of the front-end receiver 18 is a digital audio signal (which may or may not be encrypted) and that the A/D and audio decoder system 16 includes suitable digital-to-analog conversion circuitry for producing an analog audio output signal for output to speaker 17.

The receiver 12 is provided with a processor 22 having a memory device 24. The memory device 24 can be used to store the receiver identification and a decipher key 26 as required. When an S-band digital audio signal 28 is received at the receiver 12, the processor 22 determines whether the signal 28 is encrypted. If the signal 28 is encrypted, the processor 22 calls up the key 26 from receiver memory 24 and causes the front-end receiver 18 to decipher the RF signals prior to sending the signals to the A/D and audio decoder system 16.

The receiver 12 also sends the demodulated but undeciphered digital audio signal to the player/recorder device 14 and stores the signal in a player/recorder memory buffer 30. The amount of signal that can be stored in the buffer 30 is dependent upon the size of the buffer 30. In the preferred embodiment, approximately two minutes of audio can be stored in the buffer 30 before it is full and must be emptied.

The player/recorder 14 is provided with a processor 32 which is connected to a memory 31, a record button 34, a play button 36, a first readable/writeable recording medium 38 a second readable/writeable recording medium 39 and a smart card reader 42. A duplicate key 26 is stored in the memory 31.

Figure 2:
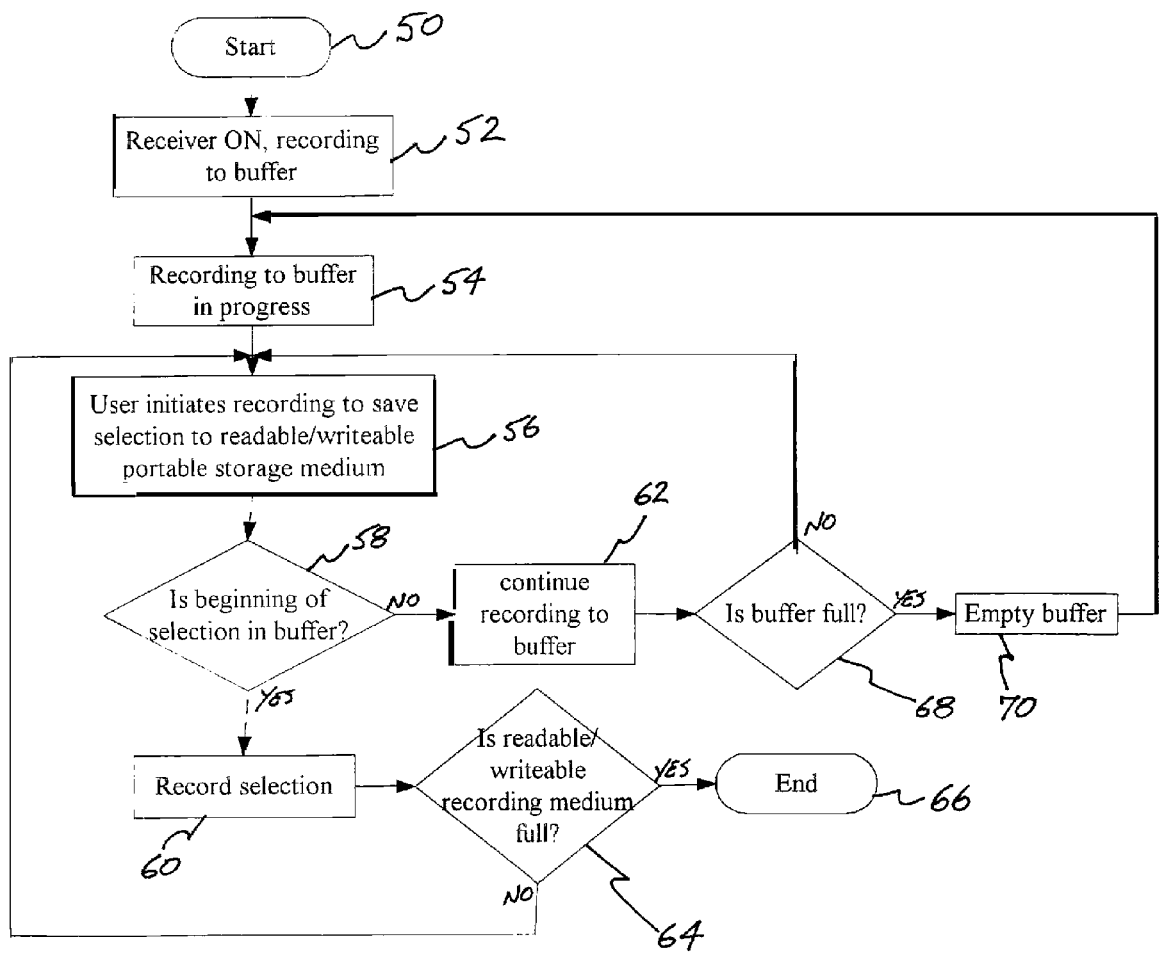
FIG. 2 is a flow chart depicting a sequence of operations for storing digital broadcast signal data in a memory and onto a recording medium.

With reference to the flowcharts in FIGS. 2-3, and by way of illustrative example, a user can record an encrypted digital audio signal 28 onto a readable/writeable recording medium 38 for later playback. The recording medium 38 can be any recording medium suitable for digital recording, such as a compact disc, a mini disc an optical disc or a digital audio tape.

The process begins at step 50, and proceeds to step 52. At step 52, a user enables the digital audio receiver 12 and the player/recorder 14, which begins recording the received signal into the buffer 30. (The buffer 30 is preferably located in the player/recorder memory 31, as described above, but can alternatively be located in the receiver memory 24.) At step 54, recording of the signal the buffer 30 continues. Next, in step 56, when a user determines that the digital audio signal should be saved onto the recording medium 38, the record button 34 is pressed, and processing continues at step 58.

In step 58, the processor 32 determines if there is enough of the signal stored in the buffer 30 to record the signal from the beginning of a broadcast segment of the signal. A broadcast segment can be, for example, the duration of a song, the portion between commercials, or any other signal duration that can be determined to have a beginning and an end.

The SDARS signal received by the receiver 12 preferably comprises multiple time division multiplexed channels of content, and each channel preferably comprises both streaming content and Program Associated Data (PAD). PAD can comprise data associated with a channel such as a song name or label, artist name or label, service ID (SID), and program ID, among other data. The service ID is an identifier (typically 8 bits) which is associated with a specific XM Satellite radio service or channel (such as Top Tracks, CNN News, The Comedy Channel, and the like) and is used by the service layer of the system to identify the specific stream containing the service at the receivers. PAD is synchronized with the streaming content of the associated SDARS channel, such that exact beginnings and endings of broadcast segments (e.g., songs, commercials, interviews, and so on) can be precisely identified based on a change in the PAD for a particular channel.

PAD can be used to assist in navigation through content stored in memory. For example, a NEXT button can allow users to move the playback location from the present song to the start of the next song. A BACK button can allow the user to move the playback location to the start of the present song or to the previous song if pressed at the start of the present song. The memory locations of the start of each song may be indexed based on the time synchronized change of the PAD updates (new song title) in a Broadcast Information Channel (BIC) or in an auxiliary data field. When the PAD information is updated, the new PAD information can be immediately saved, along with the memory location in which the streamed content is being stored at that instant. This allows the user to merely press a button to flag specific songs for purchase while listening to content during a regular broadcast. The PAD can be used to identify the content for purchase either from the content provider or from a third party vendor. The description of functional buttons is merely exemplary. The User interface may differ. Functions may be called by the same button or different buttons or combinations of buttons or controls.

If the signal stored in the buffer 30 is from the beginning of a broadcast segment, the process continues to step 60 and the player/recorder 14 begins recording the signal onto the readable/writeable storage medium 38 beginning with the beginning of the segment stored in the buffer 30. If there is not enough signal stored in the buffer 30 to record the broadcast segment of the signal from the beginning, then the process continues to step 62 and the signal is not recorded onto the readable/writeable recording medium 38.

Following recording of the broadcast segment of the signal in step 60, the process continues to step 64. In step 64, it is determined whether the recording medium 38 is full. If the recording medium 38 is full, broadcast segments of the signal can no longer be recorded onto the recording medium 38 and processing ends at step 66. If the recording medium 38 is not full, the process returns to step 56.

At step 62, the signal continues to be recorded into the buffer 30. Next, in step 68, it is determined whether the buffer 30 is full. If the buffer 30 is full, the process continues to step 70. In step 70 the buffer 30 is emptied and the process continues with step 54. If the buffer 30 is not full, the process continues at step 56.

Figure 3:
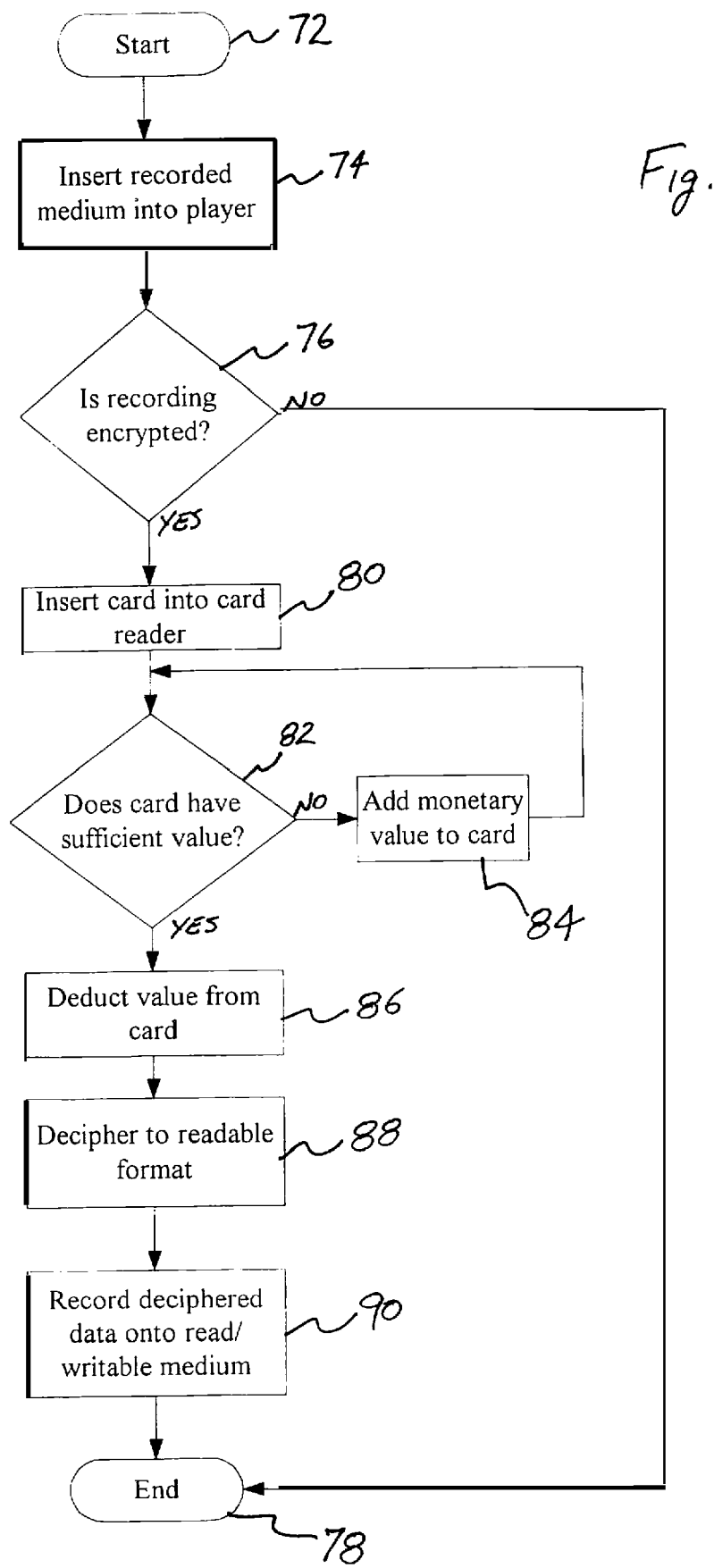
FIG. 3 is a flow chart depicting a sequence of operations for user payment and deciphering of data stored on the recording medium.

In FIG. 3, the process begins at step 72, and continues to step 74. In step 74, the recording medium 38 is inserted into the player/recorder device 14. It should be understood that the recorder/player device 14 can be two separate units (i.e., one for recording and one for playing) or one combined unit.

Next, in step 76, it is determined whether the recording on the first recording medium 38 is encrypted. If the recording is not encrypted, the process ends at step 78. If the recording on the first recording medium 38 is encrypted, the process continues to step 80. At step 80, the user inserts a smart card 40 having an encoded monetary value into a smart card reader 42. It will be understood that the smart card reader 42 can either be connected to the player/recorder 14 or located within the same physical unit as the player/recorder 14. Next, at step 82, the processor 32 determines if the card 40 has sufficient value to continue the transaction. If the card 40 does not have sufficient value, the user must add value to the card 40 at step 84. After monetary value has been added to the card at step 84, the process returns to step 82.

At step 86, the player/recorder processor 32 instructs the card reader 42 to deduct an amount from, or recode, the card 40 to pay for deciphering of the recording. After the amount is deducted from the card 40, the process continues at step 88. At step 88, the player/recorder processor 32 retrieves the decipher key 26 and deciphers the recording on the recording medium 38.

Next, in step 90, the deciphered information is recorded onto the second recording medium 39, and the process ends at step 78.

Alternatively, the first recording medium 38 and the second recording medium 39 can be the same. In step 88, the player/recorder processor 32 deciphers a portion of the encrypted recording on the recording medium 38 and transfers the deciphered portion to buffer 30. At step 90, the player/recorder 14 pauses to change from read mode to recording mode and records the deciphered portion in the buffer 30 onto the first recording medium 38. This process repeats until the entire encrypted recording is deciphered and the deciphered version is recorded onto the first recording medium 38.

Figure 4:
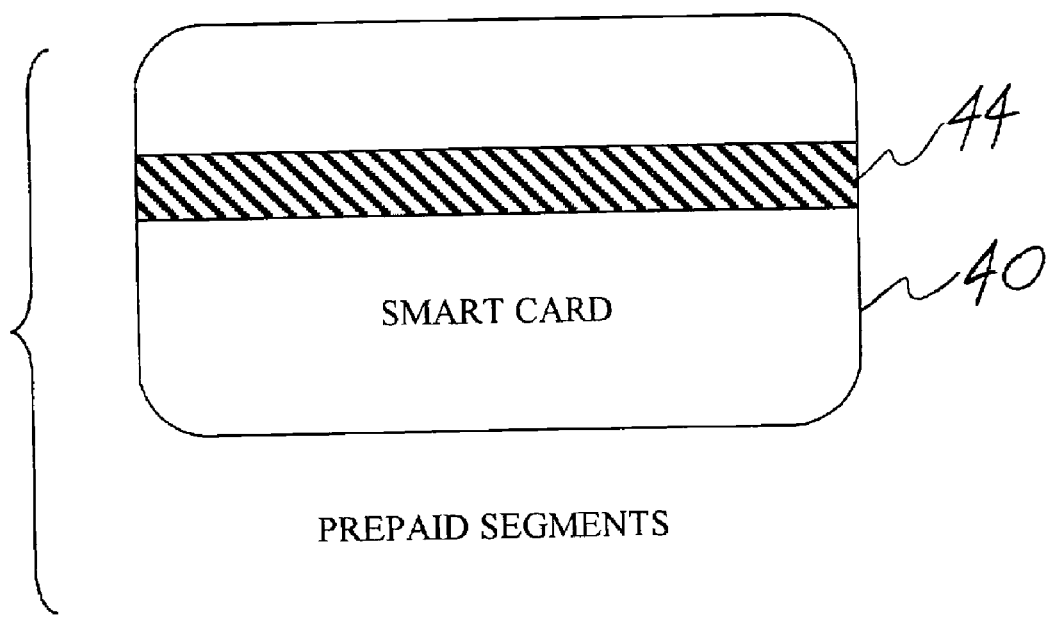
FIG. 4 illustrates a smart card for use in the present invention.
Figure 5:
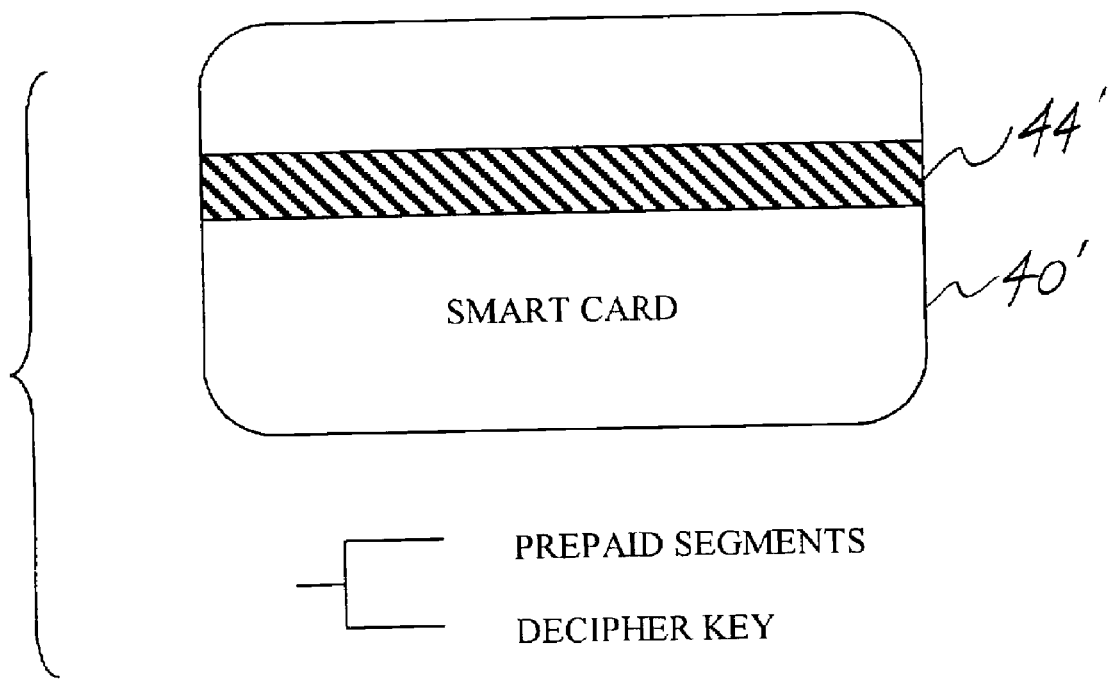
FIG. 5 illustrates an alternative smart card for use in the present invention.

FIGS. 4 and 5 illustrate two possible versions of a magnetically-encoded debit card or smart card which may be used in the smart card reader 42. In FIG. 4, the smart card 40 contains a magnetic strip 44 which is encoded with a prepaid monetary amount that can be used to purchase songs or other audio segments. When the prepaid amount is used up, the user must either recharge the card by adding more value to it, or obtain a new card.

FIG. 5 illustrates a modified smart card 40' which contains a magnetic strip 44' similar to that shown in FIG. 4. In the case of FIG. 5, however, the magnetic strip 44' is encoded not only with a prepaid amount but also a decipher key that can be used by the player/recorder processor 32 to decipher encrypted recordings.

Using the method described above, a user is provided with a smart card 40 having some encoded monetary value. Music received by the receiver 12 is continuously recorded into the buffer 30. While listening to music received by the digital audio receiver 12, the user decides that he or she wants to record a song currently being heard onto a recording medium 38, such as. a compact disc. The user then presses the record button 34 and the player 14 determines whether the beginning of the song or audio segment is still in the buffer 30. If the beginning of the desired song is no longer resident in the buffer 30, then the player/recorder 14 will not record the song onto the recording medium 38. If the beginning of the song is still resident in the buffer 30, then the player/recorder 14 will record the portion of the song stored in the buffer 30 and continue to record the signal onto the recording medium until the song is completed.

Data streams carrying digital audio content to the digital audio receiver 12 may be encrypted. In order for a user to hear the audio, the signal 28 must be deciphered using a key 26. In the above example, the user recorded a song onto a compact disc for repeat listening. However, the song was recorded onto the compact disc in an encrypted format. The user must now pay for the recording of the deciphered song in order for the player/recorder 14 to decipher the song and record the deciphered song onto a second recording medium 39. To accomplish this task, the user inserts a smart card 40 into a smart card reader 42. The smart card 40 and reader 42 can be any smart card system where a user prepays to have the card 40 encoded with a monetary value, and the reader 42 can read the card 40 and deduct a predetermined amount from the card 40 and recode the card 40 with a new, lesser amount. The total amount deducted from the card 40 can be a function of, for example, the number of songs to be deciphered or the total duration of the recording.

Following the deduction of the predetermined amount from the smart card 40 by the reader 42, the player/recorder 14 is instructed by the processor 32 to decipher and record the deciphered song. The key 26 is retrieved from memory 31 and the song is deciphered and recorded onto the second recording medium 39. After completion of this process, the user can replay the song on the compact disc repeatedly for the user's listening pleasure without ever having to decipher the song on that compact disc again.

As discussed above, the first and second recording medium 38, 39 can be the same. The player/recorder processor 32 retrieves a portion of the encrypted song, deciphers that encrypted portion, and stores the deciphered portion in buffer 30. The player/recorder 14 will then change from a play head to a record head, retrieve the deciphered portion from the buffer 30, and record the deciphered portion onto the first recording medium 38. Accordingly, the first recording medium 38 either has sufficient available recording area to record the deciphered portion, or the recording medium 38 has a reusable recording portion in order to overwrite a portion of the recordable area. Examples of a reusable recording medium are digital audio tape (DAT) and high capacity diskettes.

The card 40 can be disposable or rechargeable. That is, the user can dispose of the card 40 when the prepaid monetary value is depleted, or the card can be reused by adding more monetary value. In order to add more value to the card 40, the user can go to a suitable machine, for example, an automatic teller machine (ATM), and transfer money onto the card 40. Any suitable machine for adding monetary value to a card 40 can be used.

Although the present invention has been described with reference to a preferred embodiment thereof, it will be understood that the invention is not limited to the details thereof. Various modifications and substitutions have been suggested in the foregoing description, and other will occur to those of ordinary skill in the art. All such substitutions are intended to be embraced within the scope of the invention as defined in the appended claims.

What is claimed is:

1. An apparatus for recording and playing a digital signal, comprising:

a receiver for receiving an encrypted digital signal comprising a satellite digital audio radio service (SDARS) signal, the SDARS signal comprising streaming content data and program associated data (PAD) that is synchronized with said streaming content data, said PAD being embedded in said SDARS signal prior to said signal being received and operable to identify a change from a first broadcast segment to a second broadcast segment based on a change in the PAD associated with the streaming content data;

a buffer connected to said receiver for storing at least part of said digital signal as it is being received;

a recorder connected to said receiver for recording onto a first recording medium said encrypted digital signal in response to a user request only if a beginning of said second broadcast segment, identified by a change in the PAD of said stored digital signal, is in said buffer;

a player for playing said first recording medium and connected to a card reader; and a card having a predetermined value for insertion into said card reader;

wherein when said card is inserted into said card reader, said card reader verifies that said predetermined value is at least a selected minimum value and authorizes said player to decipher said encrypted digital signal from said first recording medium and to record said deciphered signal onto one of said first recording medium and a second recording medium.

2. The apparatus of claim 1, further comprising:

a key to decipher said encrypted digital signal, said key being stored in one of said card and a memory device in said player.

3. The apparatus of claim 2, wherein said player is a combination player and recorder, and further comprising:

a second recording medium configured to have said deciphered digital signal recorded thereon.

4. The apparatus of claim 3, wherein the first recording medium and the second recording medium are the same.

5. The apparatus of claim 1, wherein said card is a smart card having at least one of a memory device for storing monetary credits, and an integrated circuit for storing information.

6. The apparatus of claim 1, wherein said card has a memory device for storing said predetermined value, and said card reader is operable to deduct said selected minimum value from said predetermined value stored in said memory device.

7. The apparatus of claim 1, wherein said card is a prepaid smart card.

8. The apparatus of claim 7, wherein monetary value can be added and subtracted from said smart card.

9. The apparatus of claim 6, wherein said card reader is adapted to deduct said selected minimum value from said card only if said beginning of said second broadcast segment was in said buffer.

10. A method for recording and playing digital signals, comprising:

receiving an encrypted digital signal comprising a satellite digital audio radio service (SDARS) signal, the SDARS signal comprising streaming content data and program associated data (PAD) that is synchronized with said streaming content data, said PAD being embedded in said SDARS signal prior to said signal being received and operable to identify a change from a first broadcast segment to a second broadcast segment based on a change in the PAD associated with the streaming content data;

storing said encrypted digital signal in a buffer as it is being received;

determining whether a beginning of said second broadcast segment is in said buffer in response to a user request to record said encrypted digital signal, said determination based on a change in the PAD of said stored digital signal;

recording said encrypted digital signal onto a first recording medium in a recorder and player device only if said beginning of said second broadcast segment is stored in said buffer;

inserting a card having at least a predetermined value into said recorder and player device;

determining that said predetermined value corresponds to at least a selected minimum value; and deciphering said encrypted digital signal and recording said deciphered signal onto one of said first recording medium and a second recording medium if said card has said selected minimum value.

11. The method of claim 10, further comprising the step of recording said deciphered signal onto at least one of said first recording medium and a second recording medium.

12. The method of claim 10, wherein said card has a memory device for storing said predetermined value, and further comprising the step of deducting said selected minimum value from said memory device.

13. The method of claim 10, further comprising the step of determining whether to deduct value from said card based on whether said beginning of said second broadcast segment was in said buffer.

14. A method for recording and playing an encrypted digital signal, comprising:

receiving an encrypted digital signal comprising a satellite digital audio radio service (SDARS) signal, the SDARS signal comprising streaming content data and program associated data (PAD) that is synchronized with said streaming content data, said PAD being embedded in said SDARS signal prior to said signal being received and operable to identify a change from a first broadcast segment to a second broadcast segment;

storing at least part of said encrypted digital signal in a buffer as it is being received;

electing to record said encrypted digital signal onto a first recording medium;

determining whether a beginning of said second broadcast segment is in said buffer based on a change in the PAD of said stored digital signal; and recording said encrypted digital signal onto said first recording medium only if said beginning of said second broadcast segment is stored in said buffer;

inserting a card provided with a monetary amount into a card reader connected to said recorder and player;

verifying that said monetary amount corresponds to a selected minimum value; and deciphering said encrypted digital signal and recording said deciphered signal onto said first recording medium only if said card has said selected minimum value.

15. The method of claim 14, further comprising the step of adding a monetary amount to said card at one of a card vendor location and an automated teller machine.

16. The method of claim 14, further comprising the step of adding a monetary amount to said card over a computer network connection.

17. The method of claim 14, further comprising the step of playing said deciphered digital audio broadcast signals.

* * * * *